3,180,894
PROCESS FOR THE PRODUCTION OF BORO-
HYDROCARBON COMPOUNDS
Konrad Lang, Friedrich Schubert, and Alex Bürger, Leverkusen, and Werner Schabacher, Cologne-Mulheim, Germany, assignors to Farbenfabriken Bayer Aktiengesellschaft, Leverkusen, Germany, a corporation of Germany
No Drawing. Filed Dec. 24, 1958, Ser. No. 782,676
Claims priority, application Germany, Jan. 2, 1958,
F 24,735; Oct. 3, 1958, F 26,721
5 Claims. (Cl. 260—606.5)

The present invention relates to an improved process for the production of boro-hydrocarbon compounds.

Boro-hydrocarbon compounds, and more especially boralkyl compounds, are becoming of increasing technical importance and they are widely used as oxidation inhibitors, polymerisation catalysts, fuels and fuel additives.

A number of processes for preparing borohydrocarbons are known. Among the reactions which have long been known and which consist of reacting organo metallic compounds, such as Grignard compounds, or zinc, mercury or aluminum alkyl compounds with boron halides, complex metal boron halides or boric acid esters, it is only the use of organo aluminum compounds which is of possible technical interest, but their spontaneous ignitability in air and the explosive reaction which takes place on contact with water render the production and handling of these substances very dangerous and troublesome. Since aluminum alkyls only react very incompletely with boron halides it is necessary to devise additional measures, such as the addition of metal halides, in order to produce good yields.

Even at relatively high temperature, boron hydrides only react very slowly with olefines, and the reaction of diborane with ethylene at 100° C. takes four days. Since the boranes such as, for example, boro-ethane, boro-butane, boro-propane, etc. are substances sensitive to temperature, the yields are correspondingly reduced when subjected to elevated temperatures over a long period.

This process, which is of absolutely no interest technically, has recently been considerably improved by carrying out the reaction of diborane with olefines in an ether which serves as a catalyst. Mentioned in this connection as suitable catalysts are diethyl ether, tetrahydrofuran, diethylene glycol dimethyl ether, which latter is not readily available. The aforesaid process involves the use of a number of substances which as such are already dangerous or can only be handled if precautionary measures are taken. Thus, for example, diborane is an extremely toxic gas, highly inflammable and explosive in the presence of ethane, which is present in the reaction mixture when the reaction involves reacting sodium borohydride, olefins and ethers. In this connection, the ethers per se are readily combustible. When sodium borohydride, olefins and ethers are reacted, the boron alkyls are formed, which themselves tend to ignite spontaneously and very rapidly. The process thus involves a large number of danger factors.

Aluminum borohydride, like diborane, only reacts very sluggishly with olefines, even at relatively high temperatures.

On the other hand, if aluminum borohydride or a mixture of 3 mols of $NaBH_4$ and 1 mol of $AlCl_3$ in the catalytically acting solvent diethylene glycol dimethyl ether (=diglyme) in 50% excess is reacted with olefines, boron alkyls are obtained. If an attempt is made to replace diglyme by cheaper solvents such as ethyl ether or dioxane, the reaction fails or leads only to poor yields. It is known from the literature that ethers are split by aluminum chloride and therefore the process described is accompanied by secondary reactions which not only destroy the solvent, but also unfavourably influence the yield. As already mentioned above the low molecular weight boron alkyls, such as boron triethyl and above all boron tripropyl, represent the most desired boron alkyls. However, the boiling points of boron propyls and diglyme are so close to one another that separation by distillation is not possible. The only possible separation is by way of the aqueous phase which places an additional load on the process, because aluminum-hydrogen-alkyl-boron hydride compounds of varying compositions are formed as secondary products of the reaction, and these compounds react with extreme violence with water. Furthermore, boron alkyls can be obtained by reacting N-trialkyl borazanes $R_3N.BH_3$ with olefines at 100–140° C. under pressure. However, since the borazanes are prepared from diborane or sodium borohydride or from aluminum alkyls by way of boron alkyls, the use thereof offers no advantages.

The present invention provides a process for the production of boro-hydrocarbon compounds, which is characterized in that the alkali metal or alkaline earth metal borohydride or mixtures thereof are reacted with unsaturated hydrocarbons in the presence of substances which accelerate the reaction.

It has in fact been found that alkali metal borohydride, for example sodium borohydride, does not react with olefines, even at 600° C., but upon adding substances which are either able to activate the olefinic double bond or place the borohydride introduced in greater readiness for reaction, as for example acids such as hydrogen fluoride, hydrogen chloride, carbon dioxide, hydrogen bromide, acetic acid, boric acid or boron halogen compounds, for example (a) Boron halides, such as boron trifluoride, boron trichloride and boron tribromide
(b) Addition compounds of the aforesaid boron halides with ether, such as boron trihalide dimethyl etherate, boron trihalide diethyl etherate, boron trihalide tetrahydrofuranate, boron trihalide diethylene glycol dimethyl etherate etc.
(c) Addition compounds of the aforesaid boron halides with preferably secondary and tertiary aliphatic amines, to form, for example boron trihalide dimethylaminate, boron trihalide trimethylaminate, boron trihalide diethylaminate, boron trihalide triethylaminate,
(d) Addition compounds of boron halides with metal oxides, e.g. fluoborax, $Na_2O.4BF_3$.
(e) The boron trihalides mentioned in a–c may be replaced by dialkyl and monoalkyl boron halides, even in the absence of catalytically acting solvents, such as for example the ethers described above, boron alkyls are rapidly formed in very good yields. This observation will inevitably be surprising to the person skilled in the art, for it is known to him that, in the reaction of alkali metal borohydride with for example boron fluoride at 200° C., boron hydrides are formed and that these react extremely slowly with olefines in the absence of ethers, and also that the action of acids on borohydrides completely decomposes the latter with formation of hydrogen. However, mixtures of olefines with boron hydrides, or hydrogen are not formed as was to be expected according to the state of the art, but rather boron alkyls which are free from detectable quantities of borane are formed.

It is possible to use as the borohydride those of the metals of the first and second main groups of the Periodic System of the elements. It is however not necessary to introduce the borohydride as such, but in fact the production of boron alkyl and the synthesis of borohydride can be combined. In the known borohydride syntheses, metal hydrides as such or in statu nascendi (for example in the form of metal-hydrogen mixtures or as in the reaction of for example calcium carbide with hydrogen) are in principle reacted with boron compounds, for example with boron oxide, alkali metal or alkaline earth metal borohydrides, boric acid esters, borohalides or complex alkali metal borohalides.

For example, the preparation of boron ethyl from calcium borohydride and ethylene in the presence of boron fluoride can be coupled with a synthesis of $$Ca(BH_4)_2$$

from calcium hydride and boron fluoride in accordance with the equation:

$$3CaH_2 + 2BF_3 + 6C_2H_4 \rightarrow 2B(C_2H_5)_3 + 3CaF_2$$

by conducting a mixture of boron fluoride and ethylene over crude calcium hydride prepared by reacting calcium carbide and hydrogen.

Among the substances which promote the reaction between borohydride and olefine and which are characterized by the fact that they activate the carbon to carbon multiple bonds of the unsaturated hydrocarbons, as is known of $BF_3$ or HF, and/or by the fact that they place the borohydride in a state of great readiness for reaction, as is done for example by HCl and carbon dioxide, the study of the reaction with $BF_3$ gave an insight into the course of the reaction. If the reaction of sodium borohydride with olefine and boron fluoride is carried out using a large excess of olefine and if the reaction is stopped before it has ben completed, then sodium hydride is found in the residue; this means that primarily a reaction catalyzed by $BF_3$:

$$NaBH_4 + 3CH_2{=}CHR \xrightarrow{BF_3} B(CH_2{-}CH_2R)_3 + NaH$$

takes place. In a secondary reaction, the sodium hydride is reacted with consumption of boron fluoride:

$$3NaH + BF_3 + 3CH_2{=}CHR \rightarrow B(CH_2{-}CH_2R)_3 + 3NaF$$

so that the impression of a stoichiometric reaction is formed:

$$3NaBH_4 + BF_3 + 12CH_2{=}CHR \rightarrow$$
$$4B(CH_2.CH_2R)_3 + 3NaF$$

Similar considerations apply as regards the other reaction-promoting substances.

Instead of the borohalides, it is also possible to use their addition compounds, such as borohalide amine, borohalide ether or borohalide metal oxide addition products.

As regards the use of the different reaction-promoting substances, the following experiences call for discussion.

The answer to the question whether boron halogen compounds or acids are to be used must be made by observing economic and technical processing problems. By a series of syntheses which permit borohydride to be prepared directly from mineral borates, these have become inexpensive materials, the cost of which is in the region of that of borohalides. In the reaction of borohydride with olefine and boron halide, all the hydrogen combined in the borohydride is utilized for the formation of boron alkyl, and no elementary hydrogen is formed:

$$3NaBH_4 + BF_3 + 12CH_2{=}CH.R$$
$$\rightarrow 4B(CH_2.CH_2R)_3 + 3NaF$$

On the contrary, the use of the less expensive acids leads to the loss of 25% of the hydrogen combined in the borohydride, and this escapes as elementary hydrogen:

$$3NaBH_4 + 3HF + 9CH_2{=}CHR$$
$$\rightarrow 3B(CH_2.CH_2.R)_3 + 3NaF + 3H_2$$

If now low boron alkyls are produced, borohydride will be heated in the stream of olefine gas and the reaction-promoting substance will be slowly added. In this connection, the use of boron halides or their adducts is advantageous, since no $H_2$ which would dilute the gaseous olefine and could be removed therefrom only by complicated methods is formed, so high losses of olefine would have to be accepted or complicated separating plants would have to be interposed. On the other hand, if it is desired to obtain higher boron alkyls, for which olefines with a higher boiling point are required, it is then possible to work with less expensive acids, such as hydrogen fluoride, hydrogen chloride or carbon dioxide, provided this is permitted by the economy of the process, since the escaping hydrogen can be liberated simply by cooling any olefine which may possibly be entrained.

No limits are set as regards the nature of the unsaturated hydrocarbons which can be used such as e.g. butylenes, amylenes, phenyl-acetylenes, tolylacetylene, nonylenes and styrene. Since mainly low boron alkyls are required in the art, technical ethylene or propylene will usually be employed. All that is important is that the gases are free from water.

The manner in which the reaction is carried out depends very considerably on the nature of the reaction-promoting substances used.

If it is desired to produce boron alkyls with a relatively low boiling point, such as boron ethyl (B.P. 96° C.) or boron propyl (B.P. 156–160° C.), then advantageously sodium borohydride will be heated for example in a fluidized bed in a stream of the olefine to temperature advantageously between 180 and 280° C. and the boron halide will be added slowly. In a gentle exothermic reaction, boron trialkyl is then formed, and is separated out of the gas mixture just beyond the reaction zone by strong cooling, whereas the gas which has not condensed is returned to the reaction. When carrying out the reaction under the said conditions, mainly sodium fluoride is formed, with only a small quantity of sodium borofluoride being formed as reaction residue. The use of conditions differing from normal pressure can be advantageous, and boron alkyls of relatively high boiling point are more quickly removed from the reaction zone under slight vacuum; the use of a slight superatmospheric pressure suppresses the formation of partially alkylated boranes. Furthermore, the course of the reaction can be promoted by adding inert substances, such as sand or powdered glass, which cause a continual renewal and enlargement of the reactive surface of the borohydride and thus an improved reaction velocity.

The production of boron alkyls which are of relatively high boiling point or are non-volatile and having relatively large carbon chain radicals is best carried out in the liquid phase. These compounds are no longer spontaneously ignitable, and consequently solvents can be used in the manufacture thereof, although this is not absolutely necessary. Used as solvents are: water (only with carbon dioxide), hydrocarbons or also ethers, which can easily be removed because of their relatively low boiling point and, as diluents, facilitate the conducting of the reaction and the working up of the reaction product (filtration). As reaction-promoting substances, it is also equally suitable from a technical point of view to use both boron halogen compounds and acids. It is advantageous to work without pressure and at temperatures between 0° C. and the boiling point of the solvent.

The process set forth can be modified in many ways, so that after disclosure of the essential principles of the method, a person skilled in the art will readily be in a position to employ it in corresponding manner for the production of any desired boron hydrocarbon compounds.

This novel process for the production of boron hydrocarbon compounds, as described above, provides a number of vital technical improvements.

The process employs completely safe, readily available and therefore inexpensive starting substances: alkali metal and/or alkaline earth metal borohydride, boron halogen compounds or acids, in contrast to the hitherto necessary diborane and aluminum alkyls or $AlCl_3/NaBH_4$ mixtures which react very violently and frequently and even spontaneously with water. These substances are used in a new process to form boron alkyls, the only danger being the properties of the boron alkyls themselves, but additional danger factors, such as the use of readily ignitable solvents, are obviated.

Since the low-boiling boron alkyls are prepared in the absence of solvents, these are immediately obtained in pure form, so that it is practically always possible to dispense with a further purification process by distillation, which requires certain precautionary measures because of the properties of the boron alkyls and is consequently troublesome.

Furthermore, the reactions take place under conditions which technically can be very easily controlled: the reactions proceed practically without pressure and at temperatures which can conveniently be adjusted, so that the processes can readily be carried out continuously.

EXAMPLE 1

Sodium borohydride (98% $NaBH_4$) is placed in a tube provided with a paddle worm having a very low conveying speed and a mixture of 2–4 parts by volume of ethylene and 1 part by volume of boron trifluoride is conducted therethrough in countercurrent to the travel of the $NaBH_4$ with an external temperature of 210° C. The gas velocity is so adjusted that it exceeds the reaction velocity by a certain amount, whereby one achieves the result that the boron alkyl mixture which is formed is conveyed through the gas mixture more quickly from the hot zone. By cooling, the crude boron ethyl is separated out from the gas vapour mixture leaving the reaction vessel. Distillation of the boron alkyl mixture, which is obtained in a very good yield in relation to the consumption of sodium borohydride, produces boron triethyl as the main product; the first runnings consist of small quantities of boron-ethyl-hydrogen compounds and the last runnings of boron alkyls in which the ethyl groups are partially or completely replaced by radicals which are formed from the ethylene by polymerization, or groups which originate from impurities in the ethylene, for example propylene. Furthermore, secondary products containing fluorine are obtained.

EXAMPLE 2

Using a conical fluidized bed, 10 kg. of sodium borohydride with an average grain size of 1 mm. are heated at 0.25 atm. gauge to 200° C. in a stream of propylene which is circulated by means of a circulating pump. 0.08 to 0.2 part by volume of boron trifluoride is then introduced for each part by volume of newly supplied propylene and the temperature is maintained in a range from 210–240° C. by the supply of cold reaction gas. 1–2 kg. of boron tripropyl, containing small quantities of compounds containing fluorine and hydrogen, are obtained hourly.

EXAMPLE 3

A solution of 60 g. of sodium borohydride in 150 ml. of water, 100 ml. of tetrahydrofuran and 285 g. of amylene is placed in a 3-necked flask; the flask is equipped with an agitator, gas inlet pipe for carbon dioxide and a reflux condenser. Before commencing the introduction of carbon dioxide, the apparatus is flushed with nitrogen. In the course of a few hours, a moderately strong stream of carbon dioxide is conducted through the solution while stirring. The temperature is kept at about 40° C. After complete reaction, the aqueous layer is if necessary separated. Tetrahydrofuran and unreacted amylene are driven out of the organic layer by distillation and boron triamyl is left.

EXAMPLE 4

Sodium borohydride in an iron boat is introduced into a tube consisting of sintered aluminum oxide, which can be heated electrically externally. The temperature is brought to 200° C. in a stream of argon and then propylene is conducted over the borohydride, this propylene having been charged with small quantities of hydrogen fluoride as a result of being conducted through liquid anhydrous hydrogen fluoride. The reaction which takes place is apparent from a rise in temperature to 290° C. At the same time, boron tripropyl is formed, and this is distilled off.

EXAMPLE 5

*Reaction of a metal hydride with a boron halide and an olefine*

Calcium hydride, $CaH_2$ is heated to 200–300° C. in an iron boat and a constant stream of a mixture of 3.5 parts by volume of ethylene and 1 part by volume of boron trifluoride is conducted over the hydride. The boron triethyl formed according to the equation:

$$3CaH_2 + 2BF_3 + 6C_2H_4 \rightarrow 2B(C_2H_5)_3 + CaF_2$$

is distilled off from the reaction chamber and is collected in a receiver cooled with iced water.

EXAMPLE 6

Production of a higher boron alkyl: boron trinonyl

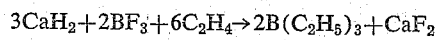
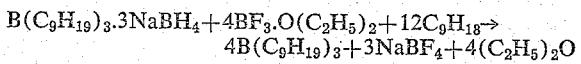

In the production of higher boron alkyls of low volatility and having practically no tendency to spontaneous ignition in air, it is advantageous to use solvents.

In a three-necked flask provided with an agitator, dropping funnel and reflux condenser, 284 g. of boron fluoride etherate (2 mols) are slowly added dropwise and while stirring to a mixture of 1 litre of tetrahydrofuran, 756 g. (6 mols) of isononylene and 57 g. (1.5 mols) of sodium borohydride. The temperature is kept below 40° C. by external cooling. In order to complete the reaction, the mixture is thereafter boiled for two hours under reflux. After cooling, it is filtered, washed with tetrahydrofuran and then tetrahydrofuran and small quantities of unreacted isononylene are distilled off from the filtrates. Practically pure boron trinonyl formed in a substantially quantitative yield is left.

EXAMPLE 7

Production of higher boron alkyl, using an acid (HCl) as reaction-promoting substance: boron triamyl $B(C_5H_{11})_3$. 38 g. (1 mol) of sodium borohydride are dissolved in 250 g. of diethylene glycol dimethyl ether and 210 g. (3 mols) of amylene are added. Hydrogen chloride is then introduced while cooling externally to 10–20° C. It is of the utmost importance that moisture should be excluded completely.

With evolution of hydrogen, boron triamyl is formed practically quantitatively according to equation $$NaBH_4 + 3C_5H_{10} + HCl \rightarrow B(C_5H_{11})_3 + H_2 + NaCl$$

this boron triamyl being obtained in pure form if the reaction product is poured into water and washed neutral with water and if excess amylene is distilled off from the product after drying over sodium sulphate.

EXAMPLE 8

Production of a partially alkylated borane:

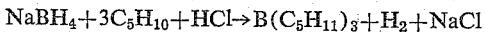

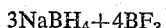
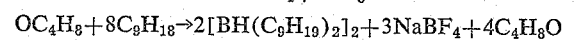

To a mixture of 125 g. of very finely pulverized sodium borohydride (3.3 mols), 1010 g. of nonylene (8 mols) and 4 litres of dried tetrahydrofuran, which is placed in a three-necked flask equipped with a stirrer, dropping funnel, immersion thermometer and reflux condenser with an offtake to the discharge outlet, there are added dropwise with vigorous stirring 615 g. of boron trifluoride-tetrahydrofuran (4.4 mols) at such a feed rate that the inside temperature does not exceed 40–50° C. If necessary, the temperature is prevented from exceeding 40–50°

C. by external cooling with ice water. After the addition of the boron fluoride tetrahydrofuran addition product the mixture is boiled under reflux with vigorous stirring for 3 hours. If the mixture becomes too viscous, it is diluted with dry tetrahydrofuran. After completion of the reaction, the mixture is allowed to cool, filtered and washed with tetrahydrofuran. The combined filtrates are separated from the tetrahydrofuran and isononylene by distillation in vacuo. Tetranonyl diborane $(C_9H_{18})_4B_2H_2$ is obtained in a substantially quantitative yield.

What we claim is:

1. Method of preparing boron triethyl which comprises reacting dry sodium borohydride with a gaseous mixture of ethylene and boron trifluoride in the absence of any solvent and diluent and recovering the boron triethyl thereby formed.

2. Method of preparing boron tripropyl which comprises reacting dry sodium borohydride with a gaseous mixture of propylene and boron trifluoride in the absence of any solvent and diluent and recovering the boron tripropyl thereby formed.

3. Method of preparing boron tripropyl which comprises reacting dry sodium borohydride with a gaseous mixture of propylene and hydrogen fluoride in the absence of any solvent and diluent and recovering the boron tripropyl thereby formed.

4. Method of continuously preparing boron trialkyls which comprises substantially continuously reacting a gaseous mixture of a mono-olefin and a hydrogen halide with a dry metal borohydride selected from the group consisting of alkali and alkaline earth metal borohydrides in the absence of any solvent and diluent and recovering the boron trialkyl thereby formed.

5. Method of preparing alkyl diboranes which comprises reacting a dry alkali metal borohydride and a gaseous mixture of mono-olefin with a hydrogen halide in approximately the stoichiometric amounts required for said reaction in the absence of any solvent and diluent and recovering the alkyl diborane thereby formed.

References Cited by the Examiner

UNITED STATES PATENTS

| | | | |
|---|---|---|---|
| 2,741,539 | 4/56 | Banus et al. | 260—462 |
| 2,855,440 | 10/58 | Walters et al. | 260—606.5 |
| 2,925,437 | 2/60 | Brown | 260—606.5 |
| 2,925,438 | 2/60 | Brown | 260—606.5 |
| 2,945,887 | 7/60 | Jenker | 260—606.5 |

FOREIGN PATENTS 792,017   3/58   Great Britain.

OTHER REFERENCES

Hurd: J. Am. Chem. Soc., vol. 70, pp. 2053–5 (1948).

Stone et al.: J. Chem. Soc. (London), pp. 2755–9 (1950).

Brown et al.: J. Am. Chem. Soc., vol. 75, pp. 192–5 (1953).

TOBIAS E. LEVOW, *Primary Examiner.*

LEON D. ROSDOL, ROGER L. CAMPBELL, OSCAR R. VERTIZ, *Examiners.*